(12) United States Patent
Tirpak et al.

(10) Patent No.: US 8,126,836 B2
(45) Date of Patent: Feb. 28, 2012

(54) CALL GROUP MANAGEMENT USING THE SESSION INITIATION PROTOCOL

(75) Inventors: Thomas M. Tirpak, Glenview, IL (US); Anant Athale, Schaumburg, IL (US); Kevin D. Bailey, Lake Zurich, IL (US); Samir Dilipkumar Saklikar, Mumbai (IN)

(73) Assignee: Motorola Mobility, Inc., Libertyville, IL (US)

(*) Notice: Subject to any disclaimer, the term of this patent is extended or adjusted under 35 U.S.C. 154(b) by 844 days.

(21) Appl. No.: 12/134,754

(22) Filed: Jun. 6, 2008

(65) Prior Publication Data
US 2009/0307177 A1    Dec. 10, 2009

(51) Int. Cl.
*G06F 7/00* (2006.01)
*G06F 17/30* (2006.01)

(52) U.S. Cl. .......... 706/53; 707/758; 707/769; 707/775; 707/778

(58) Field of Classification Search .............. 706/46
See application file for complete search history.

(56) References Cited

U.S. PATENT DOCUMENTS
6,014,655 A    1/2000    Fujiwara et al.
(Continued)

OTHER PUBLICATIONS

Jordan et al., Hierarchical Mixtures of Experts and the EM Algorithm [online], 1993 [retrieved on Sep. 18, 2011]. Retrieved from the Internet:< URL:http://citeseer.ist.psu.edu/viewdoc/summary?doi=10.1.1.136.9119>.*

(Continued)

*Primary Examiner* — Jeffrey A Gaffin
*Assistant Examiner* — Nathan Brown, Jr.

(57) ABSTRACT

A method, apparatus, and electronic device for hierarchical communications are disclosed. A connection interface 1260 may receive a query. A processor 1210 may select an initial expert from the hierarchical expert tree based upon the query and direct the query towards the initial expert. A session initiation protocol server 418 may generate a hierarchical expert tree from an expert pool.

19 Claims, 12 Drawing Sheets

U.S. PATENT DOCUMENTS

| | | |
|---|---|---|
| 7,257,628 B2 | 8/2007 | Liskov et al. |
| 7,383,347 B2 | 6/2008 | Ebling et al. |
| 2003/0004909 A1 | 1/2003 | Chauhan |
| 2005/0226530 A1 | 10/2005 | Murayama |
| 2007/0094228 A1 | 4/2007 | Nevin et al. |
| 2007/0208727 A1 | 9/2007 | Saklikar et al. |
| 2007/0209069 A1 | 9/2007 | Saklikar |
| 2007/0260587 A1 | 11/2007 | Mohan |
| 2009/0037443 A1 | 2/2009 | Athale et al. |

OTHER PUBLICATIONS

Dae Shik Im, "PCT/US2009/045552—PCT International Search Report and Written Opinion," WIPO, ISA/KR, Korean Intellectual Property Office, Daejeon, Republic of Korea, Dec. 28, 2009, 12 pages—most relevant pp. 7-9 and 11.

Anant Athale, et al.; "Intelligent Group Communication", U.S. Appl. No. 11/832,709, filed Aug. 2, 2007.

* cited by examiner

200

300

| Query ID 502 | Nodes 504 | Depth 506 | Breadth 508 | Interconnections 510 | Sub-Nodes 512 | Other 514 |

| Tree Type 802 | Tree ID 804 | Expert ID 806 | Reply Period 808 | Location 810 | Availability 812 |

CALL GROUP MANAGEMENT USING THE SESSION INITIATION PROTOCOL

CROSS REFERENCE TO RELATED APPLICATIONS

This application is related to application Ser. No. 11/832,709, filed Aug. 2, 2007.

FIELD OF THE INVENTION

The present invention relates to a method and system for gathering and disseminating data between a group of users. The present invention further relates to using a hierarchical expert tree to manage data.

INTRODUCTION

When seeking to gather and disseminate data from a group of networked users containing many expert users, a user may seek to communicate on a one-on-one basis or a one-to-many, or broadcast, basis. The communications may be a text or voice message. Group communications may be integral to social networks where an individual user or device may simultaneously communicate with a group of users or devices. The current group communication systems may be based on "flat lists", providing the same connectivity to all users, that are defined either statically, such as instant message groups, or dynamically, such as a selective dynamic group call (SDGC).

SUMMARY OF THE INVENTION

A method, apparatus, and electronic device for hierarchical communications are disclosed. A connection interface may receive a query. A processor may select an initial expert from the hierarchical expert tree based upon the query and direct the query towards the initial expert. A session initiation protocol server may generate a hierarchical expert tree from an expert pool.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates in a block diagram one embodiment a design goalstatement.

FIG. 8 illustrates in a block diagram one embodiment of an expert profile.

DETAILED DESCRIPTION OF THE INVENTION

Figure 1:
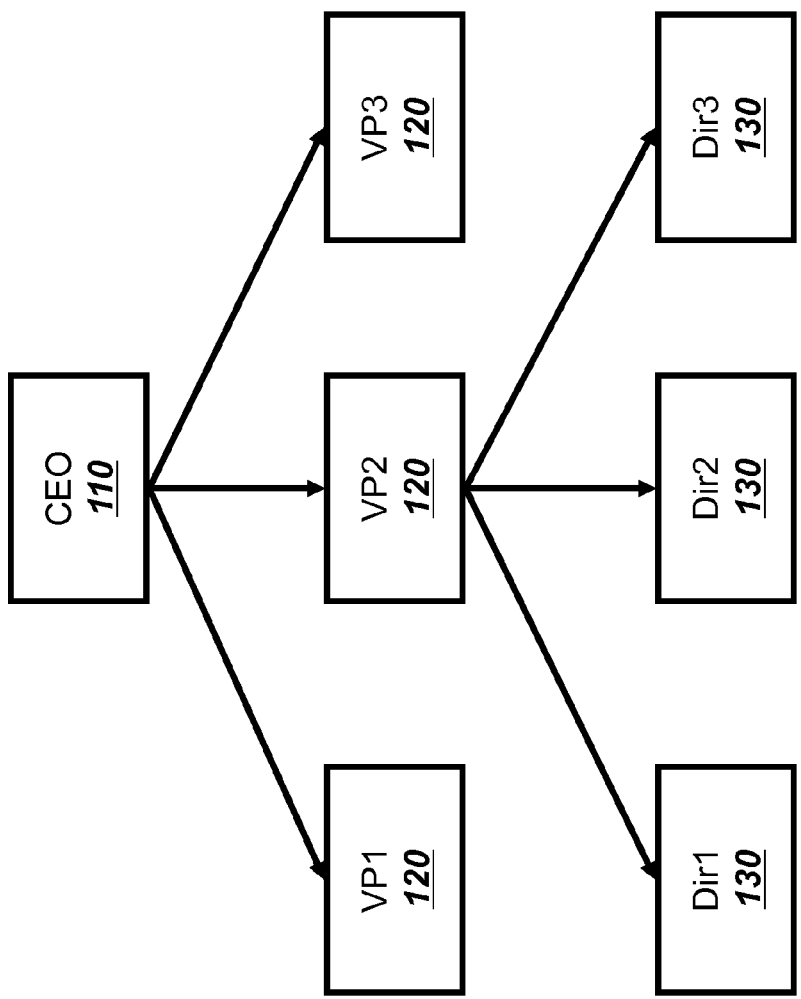
FIG. 1 illustrates in a block diagram one example of a hierarchical communications tree.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device. A method, apparatus, and electronic device for hierarchical communications are disclosed. A connection interface may receive a query. A processor may select an initial expert from the hierarchical expert tree based upon the query and directs the query towards the initial expert. A session initiation protocol server may generate a hierarchical expert tree from an expert pool.

The hierarchical group communication system may be used to process a query. A query may be a request seeking an answer to a data query, such as locating information residing with one or more members of the group. The hierarchical group communication may arrange the users in a tree structure such that the original root node is the communication initiator. A communication message may propagate through other nodes based on the level of the node in the tree. The hierarchical group communication may be transmitted as a text message, a voice message, a multimedia message, or other message medium.

Unlike the flat groups that contact all the nodes in a group, a hierarchical group may contact a node or nodes, propagating the communication to lower or higher level nodes as required. The hierarchical group may optimize the call and network overhead associated with a group call for the purpose of accomplishing a specific task, such as answering a question. The communication may resume at each contacted node and propagate further in the tree, instead of terminating on the contact node or nodes in a "flat list". The hierarchical groups may be statically defined and maintained in a common directory accessible to all the nodes or may be dynamically published by the node that initiates or propagates the call. The hierarchical group may be dynamically formed based on the user specified criteria and contact node characteristics, rather than relying on the user selection of nodes required by the selective dynamic group call feature. The hierarchical group may be initially based on the organizational chart for the overall group. The hierarchical group may be continuously monitored for any data events, such as node timeout triggered by a failure of the contact node to respond after a given set of time. These data events may trigger adjustments to the tree, including tree regeneration, branch regeneration, the addition or removal of contact nodes, re-layout of the tree, and other tree adjustments. Due to reduced network overhead, the hierarchical groups may be scaled up or down depending upon the query context.

FIG. 1 illustrates in a block diagram one example of a hierarchical communications tree 100. In this example, the chief executive officer (CEO) 110 of a company may be looking for information about a certain technology. The CEO 110 may initiate a query about this information retrieval task with a subordinate officer 120, such as a vice president (VP), asking for information. The VPs 120 in turn may initiate a search within the VPs' organizations if necessary to complete the given query. The information may be made available by one of the nodes, such as a director 130 (Dir 3), under a VP 120 (VP2). The information may then be forwarded to the CEO 110 therefore completing the "search" process workflow.

Figure 2:
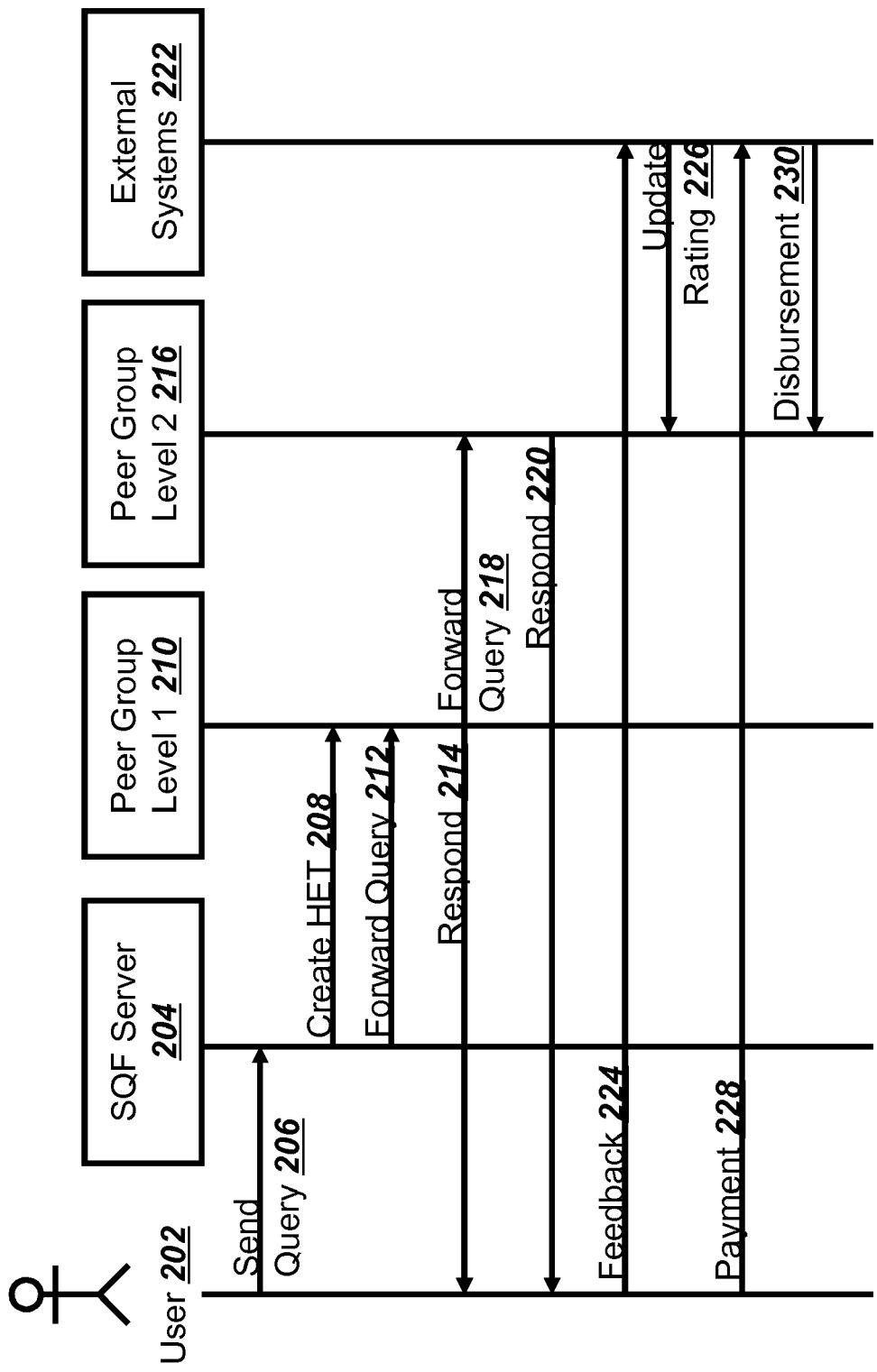
FIG. 2 illustrates in a block flow diagram one embodiment of a hierarchical querying system.

FIG. 2 illustrates in a block flow diagram one embodiment of a hierarchical querying system 200. A user 202 may send a query to a structured query framework (SQF) server 204 (Arrow 206). The SQF server 204 may create a hierarchical expert tree (HET) from a pool of experts (Arrow 208). The SQF server 204 may forward the query to a first level peer group 210 (Arrow 212). A peer expert of the first level peer group 210 may send a response to the user 202 (Arrow 214). The response may be the answer to the query, may be to establish a real-time communication session with the user 202, or may be to schedule a real-time communication session with the user 202. The real-time communication session may be a text session, voice session, video session, hybrid voice and data session, or other types of communication. If the peer expert of the first level peer group 210 thinks that a peer expert in a second level peer group 216 may be better suited to respond to the query, then peer expert of the first level peer group 210 may forward the query to the second level peer group 216 (Arrow 218). The peer expert of the second level peer group 216 may send a response either directly to the user 202 or via the first level peer group 210 (Arrow 220).

A variety of external systems 222 may provide services beyond the routing of queries. Upon receiving an answer, the user 202 may send feedback to an external rating system 222 (Arrow 224). The external rating system 222 may forward that feedback to the peer expert that answered the query (Arrow 226). If the system is a pay-per-query system, the user 202 may send payment to an external billing system 222 (Arrow 228). The external billing system 222 may send a disbursement to the answering peer expert (Arrow 230).

Figure 3:
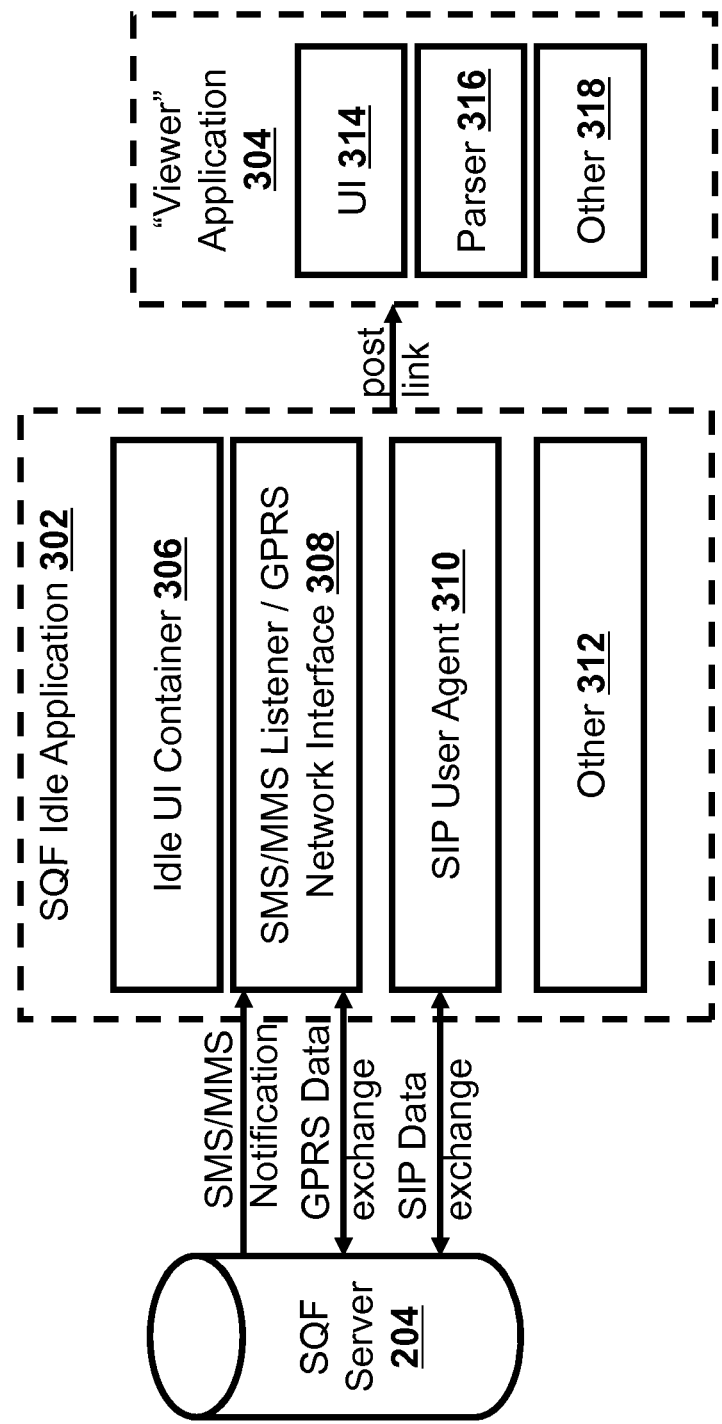
FIG. 3 illustrates in a block diagram one embodiment of a structured query framework client software architecture.

The user 202 may access the SQF via a client software application. FIG. 3 illustrates in a block diagram one embodiment of a SQF client software architecture 300 that may reside on a device belonging to an expert user or a regular user. The SQF server 204 may connect via a general packet radio service (GPRS) data exchange with a SQF idle application 302 resident on a user device. The SQF idle application 302 may post a link to a viewer application 304. The SQF idle application may have an idle user interface (UI) container 306, a GPRS network interface 308, a SIP user agent (UA) 310, and other features 312, such as an extensible markup language (ML) parser, skin options, user settings database, and other options. The idle UI container 306 may open and close the container, may present posts in a query thread, may allow a user to scroll between posts in a query thread, may allow a user to receive a response to query posts, may launch the viewer application 304, may launch a wireless application protocol (WAP) browser, and may perform other functions. In a short message service (SMS) system or a multimedia message service MS) system, the GPRS radio interface 308 may act as a SMS listener or a MMS listener and may receive a SMS or a MMS notification from the SQF server 204.

The SIP UA 310 may connect the SQF server 204 to a user 204. The SIP UA 210 may receive a SIP message containing a SQF message with various attributes of a HET. The SIP message may notify the SIP UA 210 to establish sessions with the next level of the HET. The SIP UA 210 may store with the device a received calling tree or sub-tree from within the SQF message. If a communication session may benefit from a user interaction, particularly real-time user interaction, then the SIP UA 210 may determine from the user 202 a suitable time to set up a communication session. The SIP UA 210 may schedule a session with the appropriate child nodes within the HET, or automatically establishing a session if necessary.

The viewer application 304 may have a UI 314, a hypertext markup language (HTML) or XML parser 316, and other features 318. The viewer application 304 may present to the user a post in a query thread in a user friendly manner, may allow a user to post new query threads, may receive user replies to posts in a query threads, may present a user profile to a user, may allow a user to rate a message, and other features.

Figure 4:
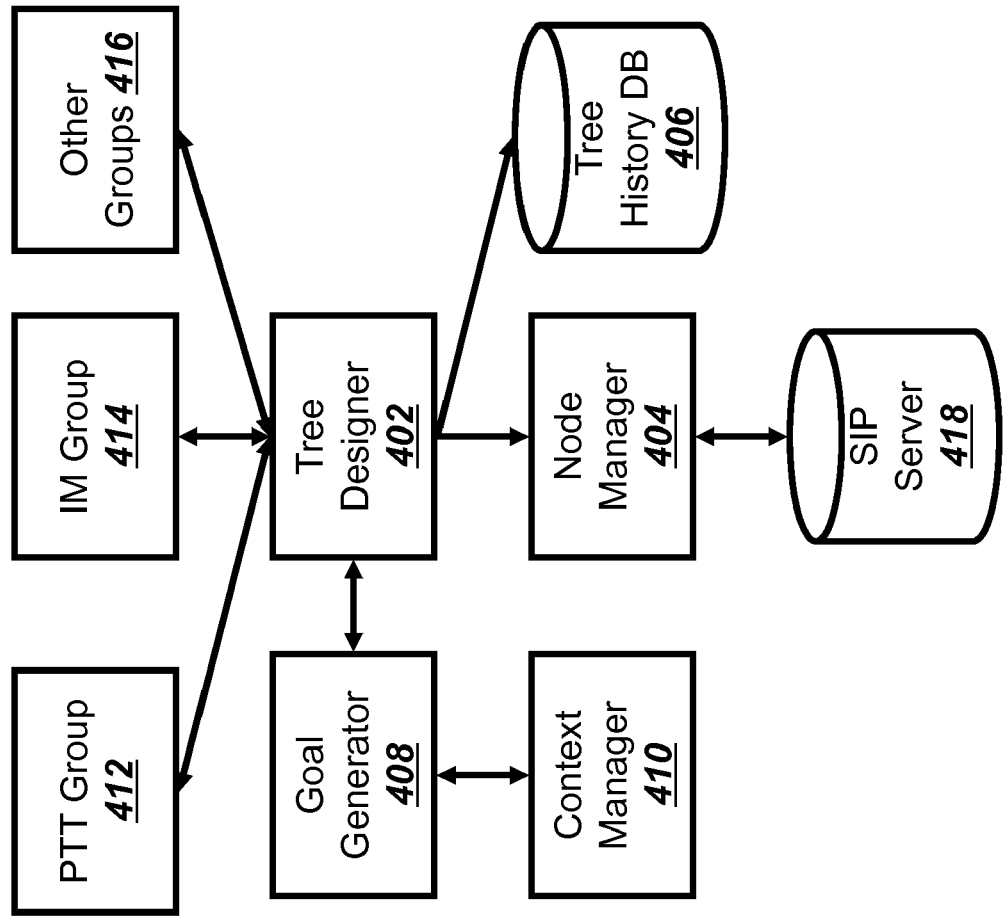
FIG. 4 illustrates in a block diagram one embodiment of the server functionality of a tree manager for hierarchical groups.

FIG. 4 illustrates in a block diagram one embodiment of the server functionality of a tree manager 400 for hierarchical groups. A tree designer 402 may use hierarchical groups defined manually by the user or generated dynamically based on the context of the query to generate a hierarchical communications tree.

A node manager 404 may manage the various individual contact nodes that may be composed hierarchically by the tree designer 402. Each contact node may correspond to a single end-user device or service agent. The node manager 404 may maintain a node profile. The node profile may include the static information associated with the contact node, such as node address, phone number, IM address, or other node information. The node manager 404 may also maintain the node's dynamic properties, such as presence, location, or other dynamic properties. The node manager 404 may also dynamically manage the metadata associated with each node during a hierarchical group call. The node manager 404 may be the bridge between the method of managing the tree and the external application that is using the tree. The node manager 404 may have access to the continuously collected incremental knowledge from the nodes, related to the type of hierarchical group communication, such as a query about the topic "user interface technology". External to or within the node manager 404 this knowledge is aggregated, using any one of the available automated knowledge management techniques, such as summarization, topic identification, and text mining. The node manager 404 may compute a score to reflect when the communication is "done". Such a score may reflect the level of confidence or sufficiency of information collected since the inception of a particular hierarchical group communication. The node manager 404 may apply timeout policies and update a local representation of the HET.

A tree history database (DB) 406 may maintain historical information associated with the hierarchical groups. This information may include the tree, or node graph, utilized for a given goal, the success rate associated with a given tree for a given goal, or other historical data regarding hierarchical communications trees. The tree designer 402 may utilize the historical information to dynamically generate new hierarchical communications trees.

A goal generator 408 may utilize the context information of a query to generate a specific goal statement used by the tree designer 402 to construct or adapt a tree. The goal statement may be either user defined or derived by the system based on the query and the context of the query, as determined by the context manager 410. The context of the query may be the physical context, task originator context, or temporal context, such as a time of day, frequency, or other temporal information.

FIG. 5 illustrates in a block diagram one embodiment a design goal statement 500. A query identifier 502 may identify the query associated with the design goal statement. The design goal statement may include a set of tree criteria describing quantifiable characteristics of the tree structure and the nodes within the tree. The tree structure characteristics may be number of nodes 504, tree depth 506, tree breadth as measured at the lowest level 508, total number of interconnections 510, average number of sub-nodes connected to a root node 512, and other tree structure characteristics 514. The tree nodal characteristics may be the number of acknowledged subject matter experts (SMEs), number of times that a node has responded within a specific time to a given query, and other tree nodal characteristics.

The tree designer 402 may generate a hierarchical communications tree based on the design goals provided by the goal generator 408. The tree designer 402 may use available nodes from the node manager 404. The available contact nodes may be from a push to talk (PTT) group 412, an instant messaging (IM) group 414, or other communications group 416. The tree designer 402 may reuse a tree from the tree history database 406 or construct a new one based on the design goal.

The tree manager 400 may use session initiation protocol (SIP) to control interactions with the HET. The node manager 404 may use a SIP server 418 to invite a node from a given point in HET, invite a set of sub-nodes, remove a node, replace a node, or query the status of a node. The SIP server 418 may report the status of a node, the establishment of a connection to a node, the completion of a call to a node, or other node activity to the node manager 404. The SIP server 418 may initiate sessions between nodes at different levels in the calling tree. The SIP server 418 may maintain a record of the real-time status of the calling tree. The SIP server 418 may asynchronously notify the user 202 that a given session is part of a HET and that the participants in the given session may be invited to subsequent sessions with nodes at the next level in the HET.

The tree manager may use multiple SIP servers 418. The SIP server 418 of the caller node may construct a message representing a sub-tree relative to a receiving node on a receiving SIP server 418. The message may be transmitted to the receiving SIP server 418, to be used in inviting the receiving node. Any call status information at the receiving node may be forwarded to and maintained by the SIP server 418 interacting with the initiating node manager 404.

Figure 6:
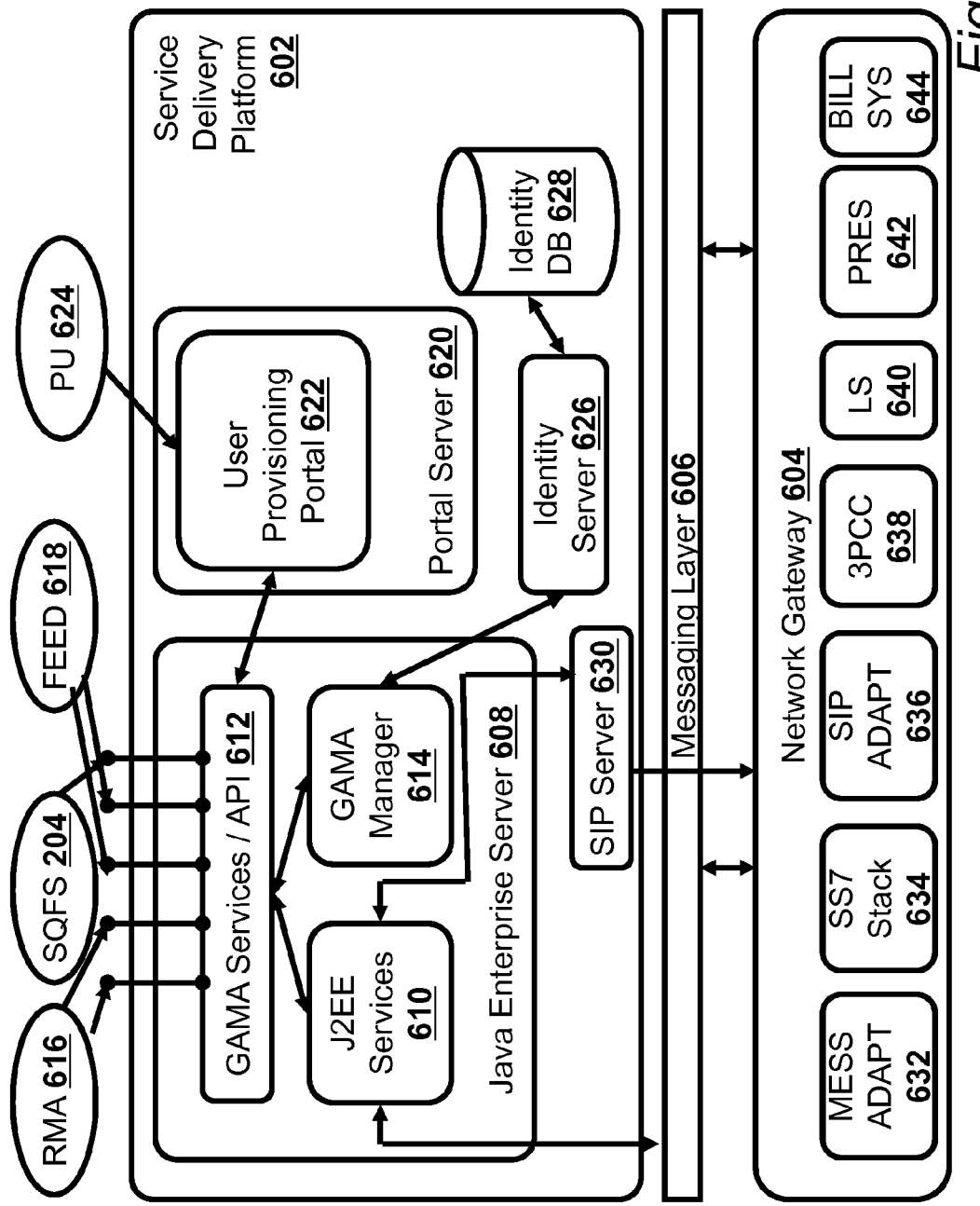
FIG. 6 illustrates in a block diagram one embodiment of a structured query framework server architecture.

FIG. 6 illustrates in a block diagram one embodiment of a SQF server architecture 600. A SQF server (SQFS) 204 may use a service delivery platform 602 to access a network gateway 604 via a messaging layer 606 or message queue (MQ). The service delivery platform 602 may provide SIP support, signaling system #7 (SS7) support, location support, simple mail transfer protocol (SMTP), packaged applications, open standards, enhanced portal use, and other features.

The service delivery platform 602 may use a number of servers to provide a variety of services. A Java® enterprise server 608 may have Java® platform enterprise edition (J2EE) services 610, a grid account management architecture (GAMA) services or an application programming interface (API) 612, and a GAMA manager 614. The GAMA API 612 may be used to grant the SQF server 204, a return material authorization (RMA) 616, or a content feed 618 access to the Java® enterprise server 608. The J2EE services 610 may transfer messages to the messaging layer 606 as a MQ message in type-length-value (TLV) format using a remote method invocation (RMI) or a simple object access protocol (SOAP). A portal server 620 may use a user provisioning portal 622 to allow portal users (PU) 624 to connect with the GAMA API 612. An identity server 626 may provide entities, groups, rates, policies, and other data from an identity database (DB) 628 to the GAMA manager 614. A SIP server 630 may allow J2EE services 610 to directly access the network gateway 604.

The network gateway 604 may have a messaging adapter (MESS ADAPT) 632, a SS7 stack 634, a SIP adapter (SIP ADAPT) 636, a third party call control (3PCC) 638, a link-state routing protocol LS) 640, a presence (PRES) module 642, and a billing system (BILL SYS) 642. The MESS ADAPT 632 may execute SMTP, short message peer-to-peer protocol (SMPP), a multimedia messaging service (MM7), or other services. The SS7 stack 634 may act as a mobile application port (MAP), a customized application for mobile network enhanced logic (CAMEL) application port (CAP), or an intelligent network application port (INAP).

Figure 7:
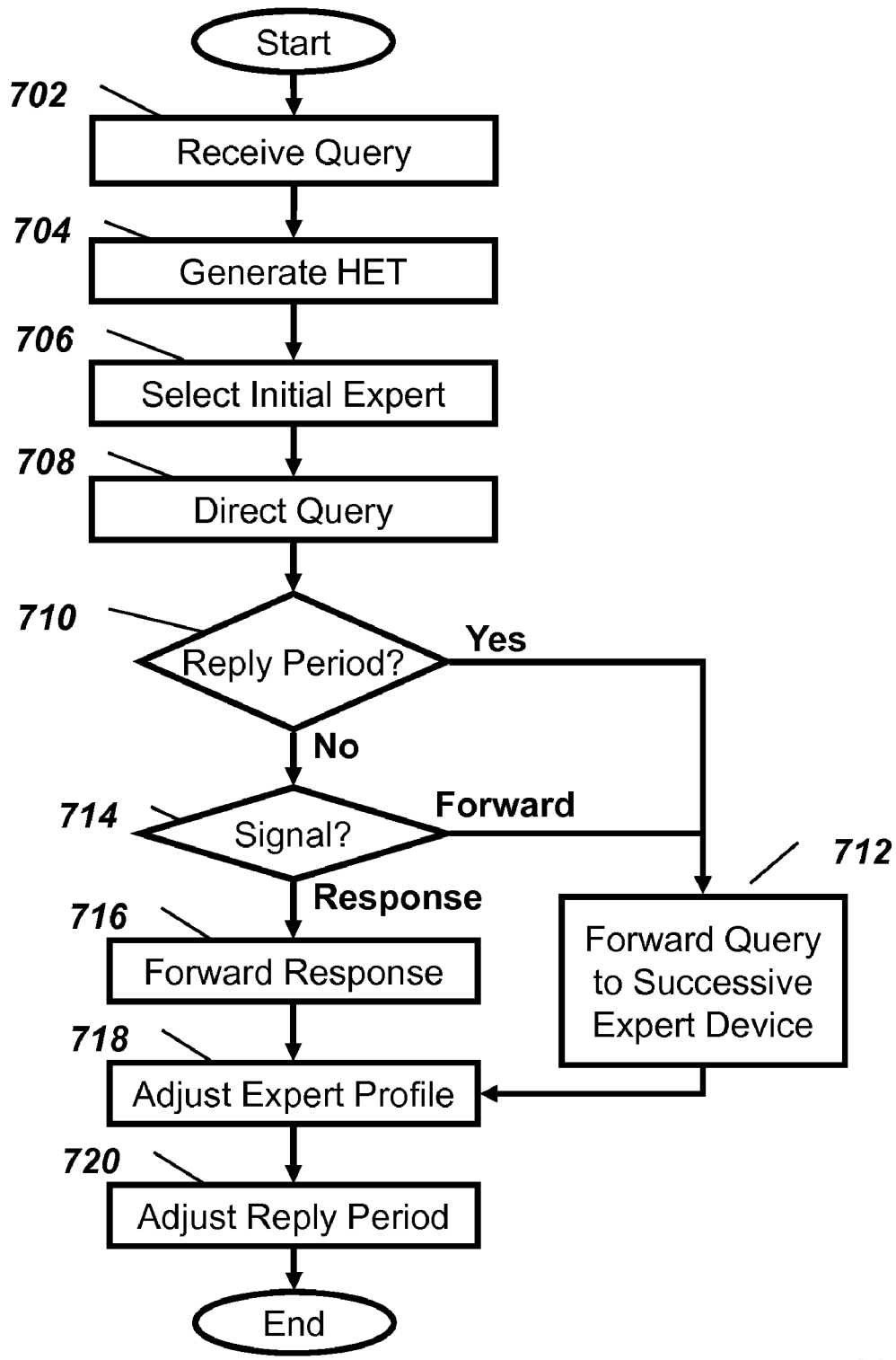
FIG. 7 illustrates in a flowchart one embodiment for a method of responding to a query using the social query framework.

FIG. 7 illustrates in a flowchart one embodiment for a method 700 of responding to a query using the SQF. The SQF server 204 may receive a query from a user 202 (Block 702). The SQF server 204 may generate a HET from a pool of experts based upon the query (Block 704). Each expert from among the expert pool may be associated with an expert profile that the SQF server 204 may use to generate the HET. The SQF server 204 may select an initial expert or set of initial experts from among the HET based upon the query (Block 706). The SQF server 204 may select the initial expert or experts based upon the associated expert profiles that best match the query. The SQF server 204 may also select the initial expert or experts based upon location or availability. The SQF server 204 may direct the query to the selected initial expert or experts (Block 708). The query may be directed to one or more devices associated with the selected expert. If the reply period for the selected expert expires without a response being received (Block 710), the SQF server 204 or a SIP UA 310 resident on the initial expert device may forward the query to an expert device of a successive expert on a higher or lower level of the HET (Block 712). If the SQF server 204 receives from the initial expert a signal or input to forward the query (Block 714), the SQF server may forward the query to a successive expert device on a higher or lower level of the HET (Block 712). If the SQF server 204 receives a response to the query (Block 714), the SQF server 204 may forward the response to the user 202 (Block 716). The response may be the answer to the query, may be to establish a real-time communication session with the user 202, or may be to schedule a real-time communication session with the user 202. The real-time communication session may be a text session, voice session, video session, or other type of communication. The SQF server 204 may adjust the expert profile of a responsive expert based upon the expert response to reflect that expert's familiarity with the subject matter of the query (Block 718). The SQF server 204 may adjust the reply period for interacting with a responsive or non-responsive expert to reflect the expert response time (Block 720). For example, the SQF server 204 may extend the reply period if a response is received after the reply period has expired.

FIG. 8 illustrates in a block diagram one embodiment of an expert profile 800. The expert profile 800 may have a tree type 802 showing the subject matter of the HET, the tree identifier (ID) 804 identifying the tree and its design goal statement 500, an expert ID 806 identifying an expert in the HET, a reply period 808 for the expert, the expert location 810, and the periods 812 during which that expert is available, or expert availability.

Figure 9:
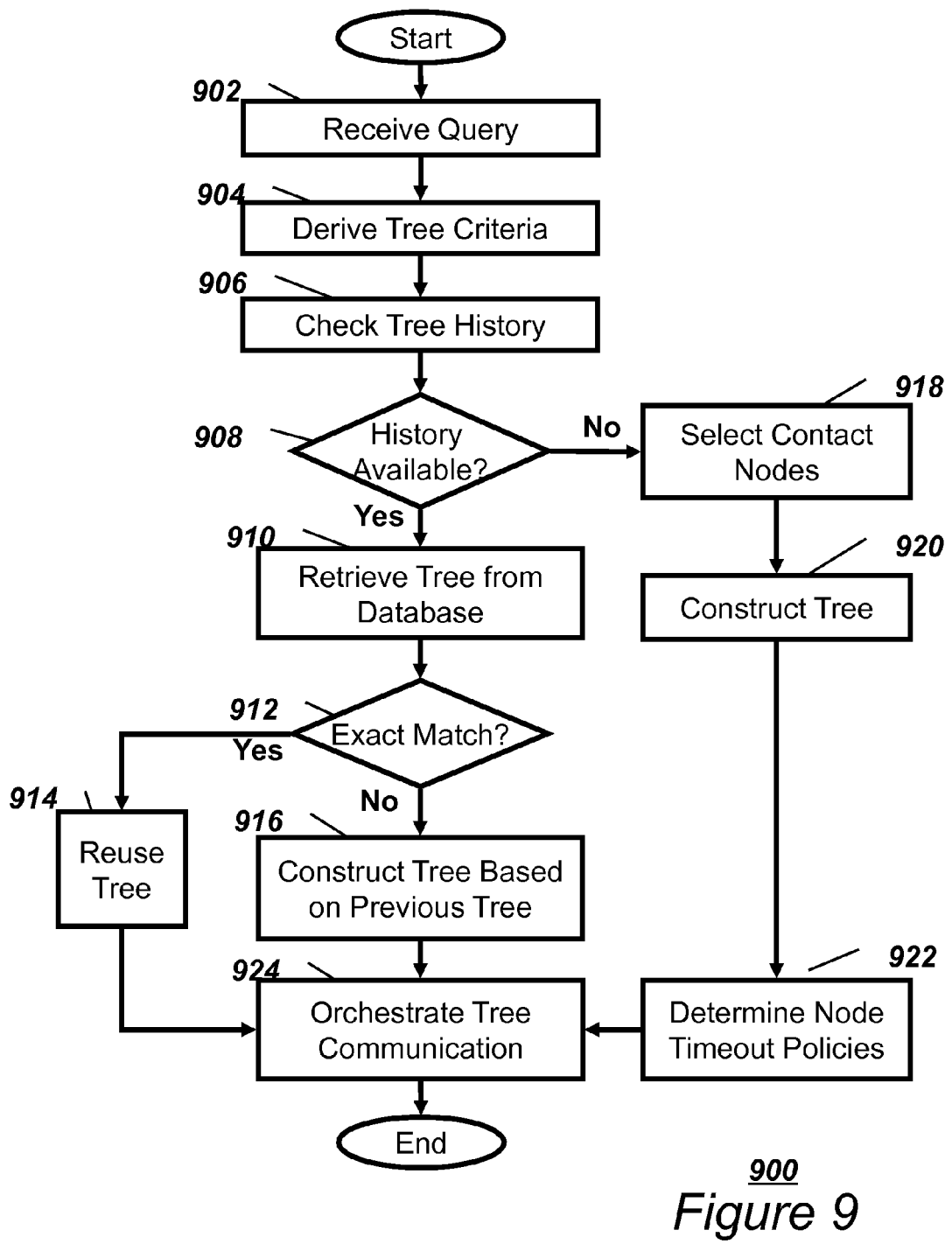
FIG. 9 illustrates in a flowchart one embodiment for a method of constructing a hierarchical communications tree.

FIG. 9 illustrates in a flowchart one embodiment for a method 900 of constructing a hierarchical communications tree. The method 900 may use user preferences and node properties. The user preferences may include tree depth, layout, acceptable redundancy, node timeout, inclusion of a specific node, exclusion of a node or nodes, and other user preferences. The node properties may include presence, location, and other node properties. The tree designer 402 may receive a query from a user (Block 902). The goal generator 408 may derive a set of tree criteria based upon the query (Block 904). The set of tree criteria may include contact nodes, tree depth, and other characteristics of the HET. The tree designer 402 may then check the tree history database 406 (Block 906). If a tree matching a pre-defined percentage of the tree criteria, including required criteria if any, is available in the tree history database 406 (Block 908), the tree designer 402 may retrieve the previously defined tree from the database (Block 910). The pre-defined percentage may be a default percentage, a percentage set by the user, an evolutionary percentage determined by the tree manager 400 to be optimum, or some other percentage. If the previously defined tree is an exact match to the set of tree criteria (Block 912), the tree designer 402 may reuse the previously defined tree (Block 914). If the previously defined tree is not an exact match to the set of tree criteria (Block 912), the tree designer 402 may construct a hierarchical communications tree based on the previously defined tree (Block 916). If a tree matching a pre-defined percentage of the tree criteria, and the required criteria if any, is not available in the tree history database 406 (Block 908), the tree designer may select a sub-group of contact nodes from the group of contact nodes available through the node manager 404 based upon the query (Block 918). The tree designer 402 may use the nodes to construct the hierarchical communications tree (Block 920). The position of a node in the group hierarchy may be determined based on the relative importance of the node for a given task as well as the acceptable redundancy. The tree designer 402 may determine node timeout policies based on the query (Block 922). The timeout policies for each contact node may determine how long the process may wait for the contact node to respond before continuing to the next available contact node in the tree. Based on a given tree and the associated timeout policies, the tree designer 402 may orchestrate the communication between the nodes (Block 924). The communication process may wait for a contact node response based on the timeout policies. The tree designer 402 may manage the start, restart, and termination of the communication process. The tree designer 402 may report the dynamic state of the communication process to a tree manager.

Via the node manager 404, the tree designer 402 may have access to incremental knowledge about the completion status of the query at hand, and use this information to guide the tree adaptation. The tree adaptation may be based on timeout status, stated goal, and knowledge state, and other metrics evaluating the effectiveness of the communication and performance of the query. The tree adaptation may include tree optimization in terms of network flow, structure, and membership. For example, to meet the design goal new nodes may be dynamically added to the tree if one of the intermediate nodes does not respond. The tree adaptation method may be implemented as an evolutionary search, leveraging existing techniques, including genetic algorithms and tabu searches.

The tree designer 402 may use trees present in the tree history to "seed" a population of candidate solutions for an evolutionary search. The evaluation function may be used to guide the selection of the historical trees to be included in the set of candidate solutions. Likewise, new trees may be included in the set of candidate solutions. These may be generated by randomized changes, including swapping one node for another, changing the timeout value associated with the link between two nodes, and swapping one sub-tree for another.

Figure 10:
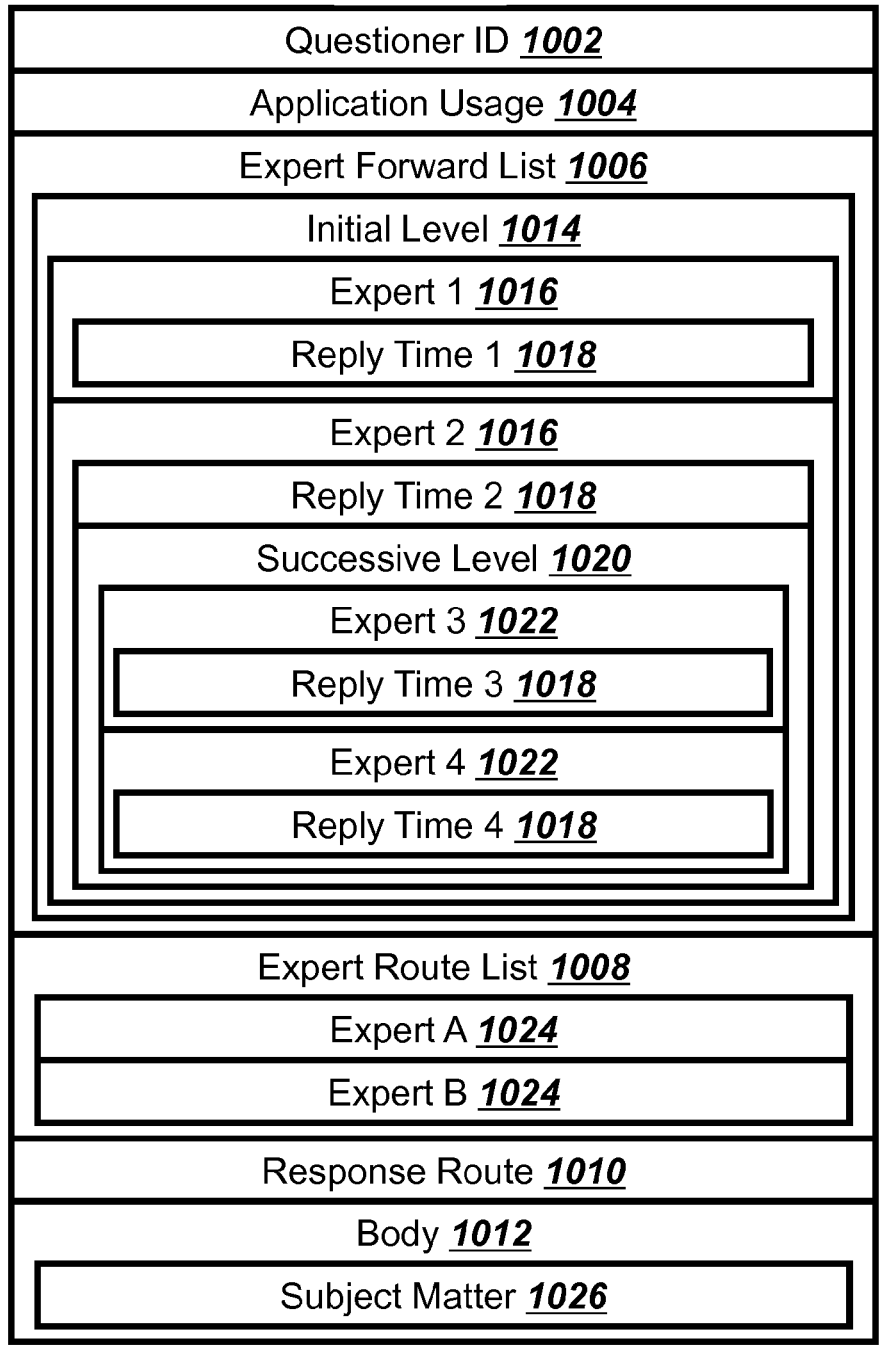
FIG. 10 illustrates in a block diagram a QUESTION that may be used to initiate a contact with an expert in the hierarchical expert tree.

The tree designer 402 may use the SIP server 418 to generate the HET and coordinate communication within the HET. A QUESTION data transmission may be piggybacked on an INVITE or MESSAGE data transmission sent by the SIP server 418 to a node. FIG. 10 illustrates in a block diagram a QUESTION 1000 that may be used to initiate a contact with an expert in the HET. The QUESTION 1000 may have a questioner identifier (ID) 1002, an application usage designation 1004, an expert forward list 1006, an expert route list 1008, a response route 1010, and a body 1012. The application usage designation 1004 may be "Generating Call Tree" and other designations. The expert forward list 1006 may designate the forward path of the QUESTION 1000. The expert forward list 1006 may have a initial level expert forward list 1014 indicating each of the experts 1016 to receive the QUESTION 1000. Each expert 1016 may have an associated reply time 1018, indicating the amount of time to wait before the message is forwarded to a successive level of experts. The initial expert 1016 may have an associated successive level expert forward list 1020, indicating the experts 1022 to whom the initial expert 1016 should forward the QUESTION 1000. While initial and successive experts are shown in FIG. 10, any number of levels of experts may be used. The expert route list 1006 may include a list of experts 1024 that have received and forwarded the QUESTION 1000. The response route 1010 may indicate whether the expert should respond through the previous experts on the expert route list 1008 or directly to the questioner 1002. The body 1012 may describe the actual question the user wants answered. The body 1012 may be further parsed into a subject matter grouping 1026 to aid with tree generation and expert profile matching.

Figure 11:
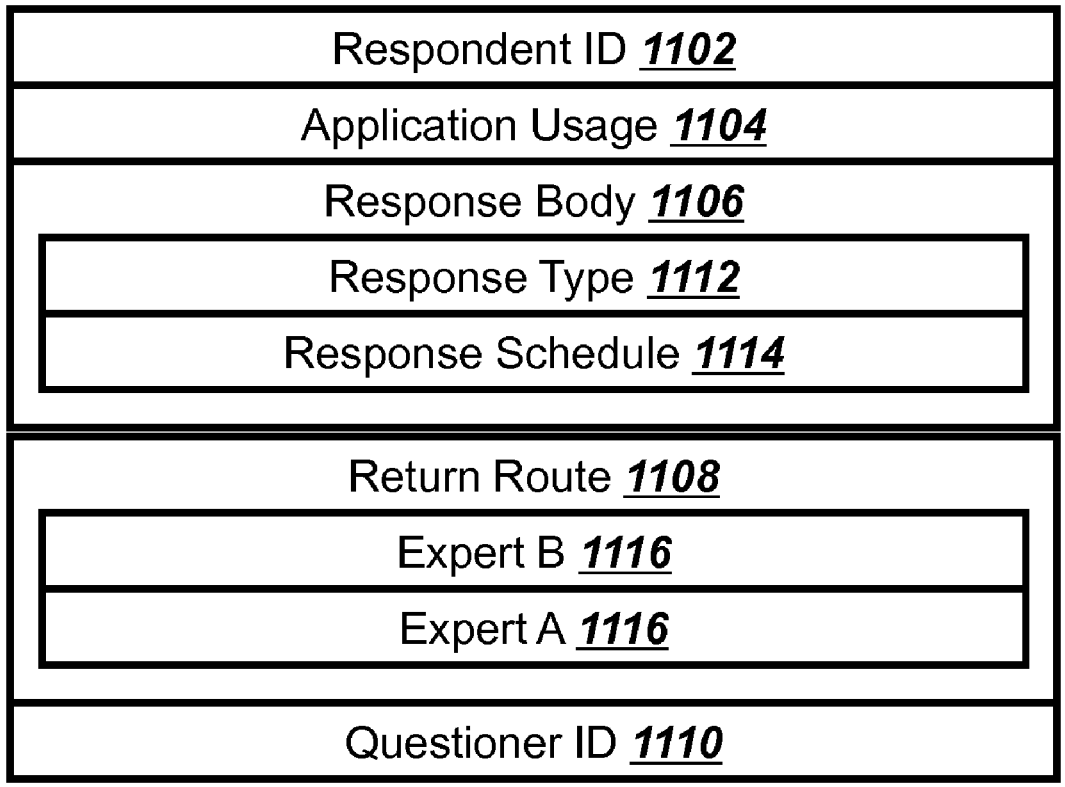
FIG. 11 illustrates in a block diagram one embodiment of an ANSWER that an expert would send in response to a user.

FIG. 11 illustrates in a block diagram one embodiment of an ANSWER 1100 data transmission that an expert would send in response to the user 202. The ANSWER 1100 may have a respondent ID 1102, an application usage designation 1104, a response body 1106, a return route 1108, and questioner ID 1110. The application usage designation 1104 may be "Completing Call Tree" or other designations. The response body may contain respondent's answer to the user's question. The response body 1106 may have a response type identifier 1112 designating the method the respondent is using to answer the query, such as text message, e-mail, instant messaging session, telephone conference, or other communication. The response body 1106 may have a response schedule 1114 proposing a time for establishing an interactive real-time communication session between the respondent and the user 202. The return route 1108 may list the experts 1116 that forwarded the QUESTION 1000 to the respondent, possibly indicating a route the ANSWER should follow back to the questioner if direct communication is not desired.

Figure 12:
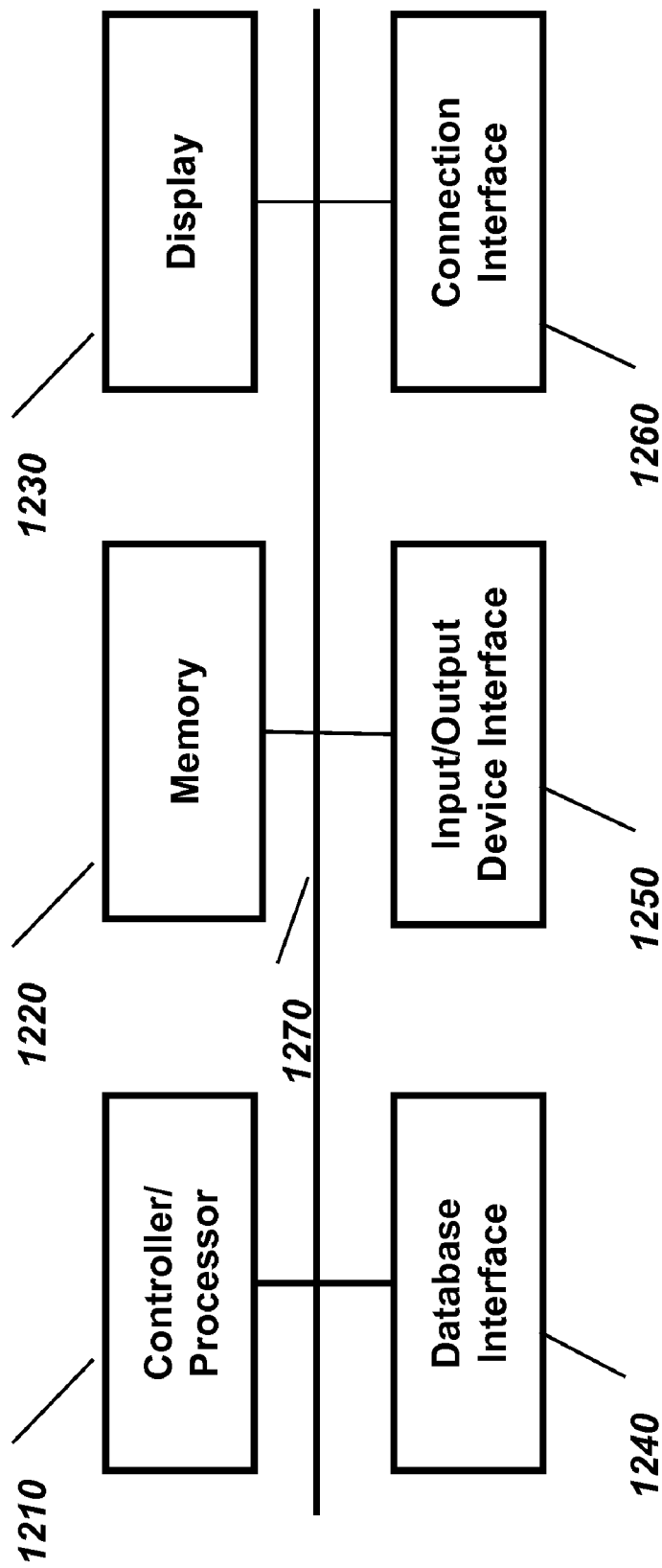
FIG. 12 illustrates a possible configuration of a computing system to act as a mobile telecommunications apparatus or electronic device to execute the present invention.

FIG. 12 illustrates a possible configuration of a computing system 1200 to act as a mobile telecommunications apparatus or electronic device to execute the present invention. The computer system 1200 may include a controller/processor 1210, a memory 1220, a display 1230, a database interface 1240, input/output device interface 1250, and a connection interface 1260, connected through bus 1270. The computer system 1200 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 1210 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The memory 1220 may include volatile and nonvolatile data storage, including one or more electrical, magnetic or optical memories such as a random access memory (RAM), cache, hard drive, or other memory device. The memory may have a cache to speed access to specific data. The memory 1220 may also be connected to a compact disc-read only memory (CD-ROM, digital video disc-read only memory (DVD-ROM), DVD read write input, tape drive or other removable memory device that allows media content to be directly uploaded into the system.

The database interface 1240 may be used by the controller/processor when executing the tree designer function 402 to access the tree history database 406. The node manager 404 may also use the database interface 1240 to access a database storing the group of contact nodes. The tree history database 406 and the contact node may be stored locally on the telecommunications device or may be accessible through the network.

The Input/Output connection interface 1250 may be connected to one or more input devices that may include a keyboard, mouse, pen-operated touch screen or monitor, voice-recognition device, or any other device that accepts input. The Input/Output connection interface 1250 may also be connected to one or more output devices, such as a monitor, printer, disk drive, speakers, or any other device provided to output data. The Input/Output connection interface 1250 may receive a query from a user.

The network connection interface 1260 may be connected to a communication device, modem, network interface card, a transceiver, or any other device capable of transmitting and receiving signals over a network. The network connection interface 1260 may be used to connect a client device to a network. The network connection interface 1260 may send and receive a query as part of the operation of the tree manager, whether as a client or a server. The network connection interface 1260 may use the SIP server 418 to create and manage communication between the nodes in the HET. The tree history database 406 and the contact node database may be accessed through the network interface. The components of the computer system 1200 may be connected via an electrical bus 1270, for example, or linked wirelessly.

Client software and databases may be accessed by the controller/processor 1210 from memory 1220, and may include, for example, database applications, word processing applications, as well as components that embody the decision support functionality of the present invention. The computer system 1200 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for hierarchical communications, the method comprising:
   receiving a query;
   selecting an initial expert from a hierarchical expert tree based upon the query;
   directing the query to an initial expert device; and
   generating a hierarchical expert tree from an expert pool based upon the query using session initiation protocol.

2. The method of claim 1 further comprising:
   using an expert profile to select the initial expert.

3. The method of claim 1 further comprising:
   using at least one of an expert availability or an expert location to match the query to the initial expert.

4. The method of claim 1 wherein the initial expert device forwards the query to a successive expert device upon an input from the initial expert.

5. The method of claim 1 wherein a session initiation protocol user agent on the initial expert device forwards the query to a successive expert device after a reply period expires.

6. The method of claim 2 further comprising:
   adapting the expert profile based upon an expert response.

7. The method of claim 5 further comprising:
   adjusting the reply period based on expert response time.

8. A telecommunications apparatus for hierarchical communications, the telecommunications apparatus comprising:
   a connection interface that receives a query;
   a session initiation protocol server that generates a hierarchical expert tree from an expert pool; and
   a processor that selects an initial expert from the hierarchical expert tree based upon the query and directs the query towards an initial expert device.

9. The telecommunications apparatus of claim 8 further comprising a database that associates an expert profile with the initial expert.

10. The telecommunications apparatus of claim 8 wherein a session initiation protocol user agent on the initial expert device forwards the query to a successive expert device upon an input from the initial expert.

11. The telecommunications apparatus of claim 8 wherein a session initiation protocol user agent on the initial expert device forwards the query to a successive expert after a reply period expires.

12. The telecommunications apparatus of claim 8 wherein the processor adjusts the reply period based on expert response time.

13. The telecommunications apparatus of claim 9 wherein the processor adapts the expert profile based upon an expert response.

14. The telecommunications apparatus of claim 9 wherein the database stores at least one of an expert availability or an expert location to match the query to the initial expert.

15. An electronic device for hierarchical communications, the electronic device comprising:
   a connection interface that receives a query; and
   a processor that selects an initial expert from a hierarchical expert tree based upon the query and directs the query towards the initial expert device.

16. The electronic device of claim 15 further comprising:
   a session initiation protocol server that generates the hierarchical expert tree from an expert pool.

17. The electronic device of claim 15 wherein the database stores an expert profile to match the query to the initial expert.

18. The electronic device of claim 15 wherein a session initiation protocol user agent on the initial expert device forwards the query to a successive expert upon an input from the initial expert.

19. The electronic device of claim 15 wherein a session initiation protocol user agent on the initial expert device forwards the query to a successive expert after a reply period expires.

* * * * *